United States Patent [19]

Rogers

[11] 3,767,249
[45] Oct. 23, 1973

[54] HAND TOOLS, PARTICULARLY FOR GARDENING

[75] Inventor: Edward A. Rogers, Ashford Common, Middlesex, England

[73] Assignee: Wilkinson Sword Limited, London, England

[22] Filed: Mar. 30, 1972

[21] Appl. No.: 239,444

[30]     Foreign Application Priority Data
   Apr. 6, 1971   Great Britain .................... 10,644/71
   May 27, 1971  Great Britain .................... 17,598/71
   Aug. 7, 1971   Great Britain .................... 37,191/71

[52] U.S. Cl. ...................................... 294/49, 294/57
[51] Int. Cl. ............................. A01b 1/02, B25g 3/34
[58] Field of Search ..................... 294/49, 55, 55.5, 294/57, 51; 15/143 R; 30/340, 344; 76/113; 209/419; 306/21, 22, 24, 35, 45

[56]         References Cited
          UNITED STATES PATENTS
2,960,230  11/1960  Fracker ............................ 294/49 X
2,399,800   5/1946  Harte ............................... 294/49 X 2,121,200  6/1938  Jonsson ................................ 294/55
1,374,336  4/1921  Surbaugh ......................... 294/57 X FOREIGN PATENTS OR APPLICATIONS
856,541  12/1960  Great Britain ....................... 294/57

*Primary Examiner*—Evon C. Blunk
*Assistant Examiner*—Johnny D. Cherry
*Attorney*—Jarrett Ross Clark et al.

[57]          ABSTRACT

The hand tool comprises a working head, such as a spade blade or a fork, welded to a tubular tang-forming portion of a handle, the tang-forming portion comprising two telescoped tubes which have been bent to a curved shape and flattened to an oval cross-section over the curved part and up to one end. The major axis of the oval section lies in the plane of curvature, and the end of the tubes is cut off obliquely in a plane normal to the plane of curvature to provide an end surface of elongate oval shape which is welded around its periphery to a flat surface of the working head.

8 Claims, 6 Drawing Figures

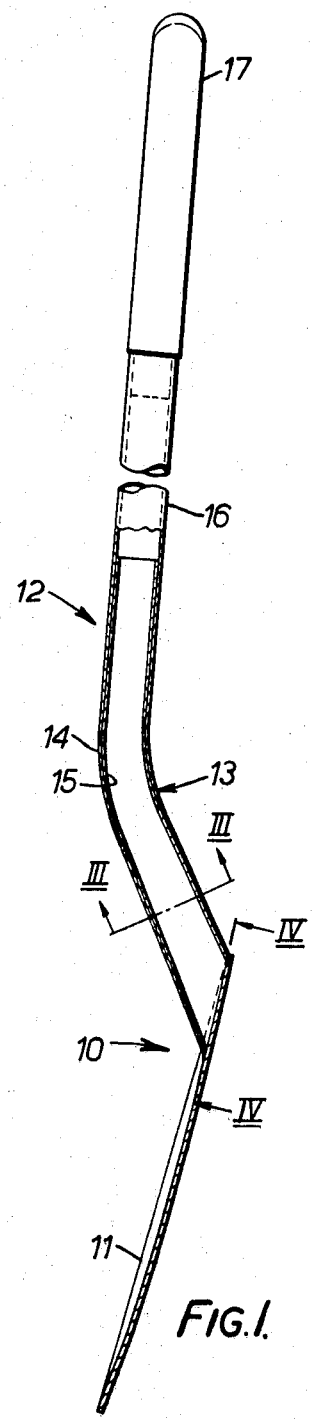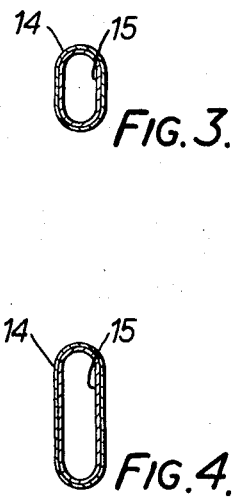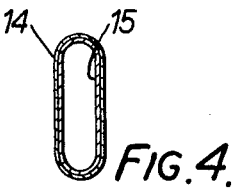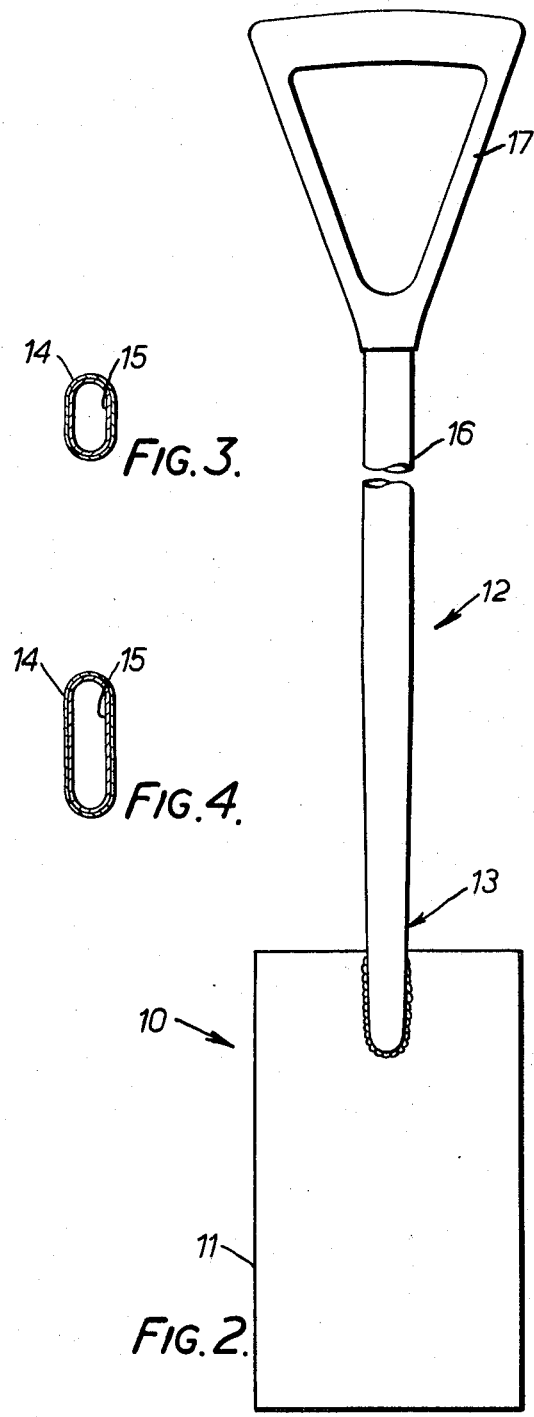

PATENTED OCT 23 1973

HAND TOOLS, PARTICULARLY FOR GARDENING

BACKGROUND OF THE INVENTION

Conventional garden tools of this type comprise a working head, in the form of a blade or fork, and a handle in the form of a shaft connected at one end to the working head through a tang integral with the working head and having a hand grip at its opposite end. In such a conventional tool the tang extends away from the upper edge of the working head which also provides the footrest. Such a tang is normally formed in solid metal and merges into a sleeve for receiving, or forming, the lower end of the shaft. Such a construction is relatively heavy and also limits the extent of the footrest.

SUMMARY OF THE INVENTION

This invention is directed to the provision of a hand tool, in particular a garden tool in which a tang-forming portion of a handle is welded to a flat surface of a working head, such as a spade blade or a fork. By the use of a tubular tang-forming portion cut off obliquely at its end to form an oval end surface and welded to the working head, a strong joint is produced without involving a heavy construction. The tang-forming portion is preferably flattened to an oval cross-section to resist bending under load.

More particularly the use of two telescoped tubes in the tang-forming portion of the handle, as described in the Abstract, yields added strength, one of the two tubes extending only over the length which bears the greatest strain and the other tube forming a support for, or being extended to form, the main part of the handle.

DESCRIPTION OF THE DRAWING

FIG. 1 is a side view, part-sectioned, of a spade formed in accordance with the present invention;

FIG. 2 is a front view of the spade of FIG. 1;

FIGS. 3 and 4 are sections on the lines III—III and IV—IV of FIG. 1;

DESCRIPTION OF PREFERRED EMBODIMENT

Figure 5:
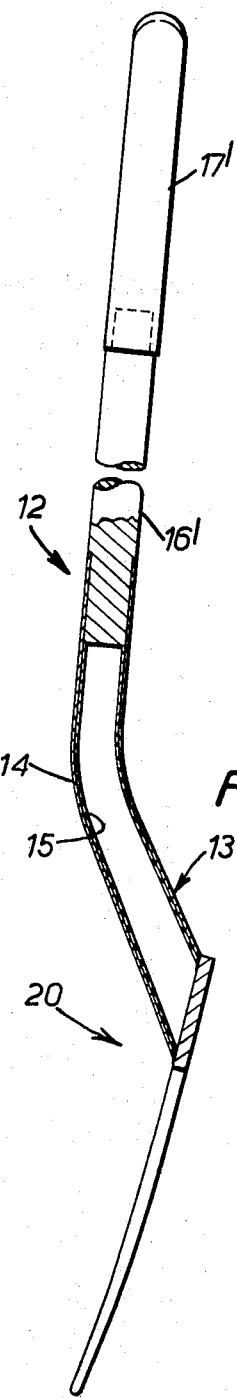
FIG. 5 is a side view of a fork formed in accordance with the present invention and illustrating an alternative shaft construction.

It will be seen from FIGS. 1 and 2 that the working head of the spade 10 is in the form of a blade 11 which can be formed from rolled steel sheet, in particular stainless steel or carbon steel, to which is welded a tang 13 forming part of the handle 12 of the tool. Before attachment of the tang, the rectangular sheet of metal forming the blade is stamped to give it the required lateral and longitudinal curvatures necessary to resist bending of the blade in use. However, the area to which the tang is to be attached will be maintained flat.

The tang is of double-walled construction and formed by telescopically fitting tightly together two tubes 14, 15 of circular section, bending the tubes to the desired degree of curvature, and thereafter flattening the tubes by the application of pressure in a direction perpendicular to the plane of curvature, which is the plane of symmetry of the bent tubes, to give the tubes an oval cross-section over the bent portion and up to the end of the tang to be joined to the blade. The opposite end of the tang can remain of circular section.

The oval cross-section of the flattened part of the tang has its major axis lying in the plane of curvature and the sides of the oval section immediately adjacent the minor axis can be relatively flat as seen in FIG. 3. It will thus be evident that the flattening of the tubes has increased the bending resistance of the tubes in the plane of curvature. One end of the double-walled tang is then cut off in a plane perpendicular to the plane of curvature and obliquely to the axis of the tubes at that end so as to form on the tang an oval annular end surface of which the major axis is substantially longer than that of an adjacent cross section of the tang normal to the axis of the tang. This elongate annular end surface of the tang will thus form the contact surface which is thereafter welded to the spade blade.

The welding of the tang to the spade blade is effected between the annular end surface of the tang and a flat surface on the front of the blade closely adjacent the upper edge of the blade, and the weld extends over an annular area of the blade in a manner to give intimate bonding between the metal of the blade and the metal of both inner and outer tubes of the tang.

After completion of welding, the blade and tang are heat treated to harden the blade and to relieve the metal from stresses in the vicinity of the weld.

It will be seen that the bending of the coaxial tubes of the tang together with the flattening of the tubes and the oblique sectioning of the end of the tubes all contribute to provide an elongate surface for welding on to the face of the blade and also to provide the necessary "lift" of the handle away from the plane of the blade to enable the user to grip the tang throughout the lifting operation when using the space. Furthermore the flattening of the tang to an oval section provides an improved hand grip resisting unwanted rotation of the spade in the hand of the user.

To give a typical example, the angle through which the tang is curved in the bending operation is 28° and the angle which the obliquely cut off end of the tang makes with the axis of the tang at that end is 35°. With regard to the ovality of the tang, typical values for the ratio of major axis length to minor axis length for the external dimensions of the sections illustrated in FIGS. 3 and 4 are 1·41 and 2·46 respectively.

The remainder of the handle 12 depend the spade can be formed in various ways. Thus in the embodiment of FIG. 1, the handle is seen to include a shaft 16 which is an integral the extension of the outer tube 14 of the tang but equally the shaft could be formed by butt welding a separate length of tube to the end of the outer tube of the tang. Alternatively the shaft could form an integral extension of the inner tube 15 of the tang, or be butt welded to the inner tube of the tang.

The choice of handle formation will depand primarily on the materials to be used. In general, it is convenient that the outer tube of the tang shall be of stainless steel, to resist corrosion, and the inner tube of mild steel for economy. The outer tube can therefore be extended in stainless steel to form tha shaft, and no further protection will be required for the shaft. If the shaft is to be of mild steel, this can be either a continuation of the mild steel inner tube of the tang or be welded to the stainless steel outer tube. In either case, the mild steel shaft is conveniently provided subsequently with a protective covering, for example a plastic sleeve. If the shaft is to be of wood, the lower end will be formed as a spigot and secured within the upper end of the tubular tang, for example by epoxy resin or rivets, as illustrated by the shaft 16' in FIG. 5.

Figure 6:
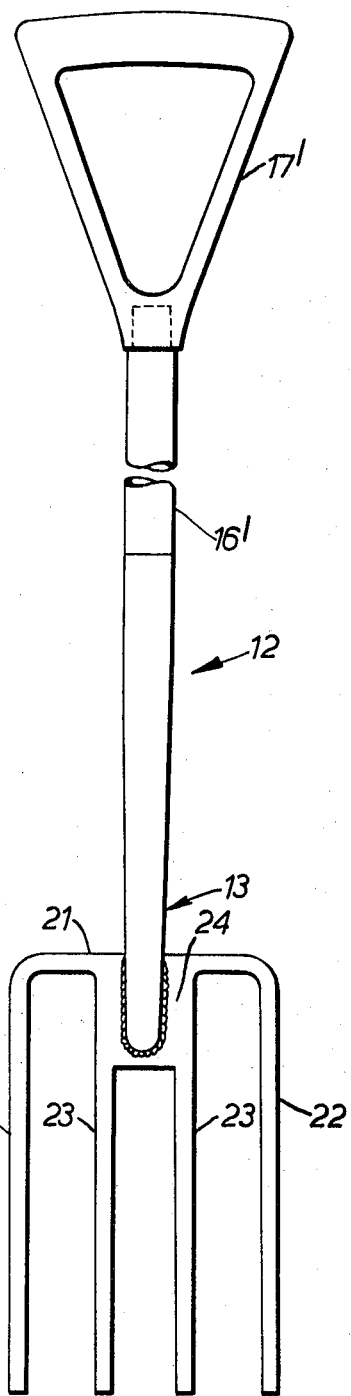
FIG. 6 is a front view of the fork of FIG. 5.

The hand grip 17 of the spade is conveniently formed as a plastic moulding with a spigot for fixing by adhesive within the upper end of a tubular shaft, or as a tubular socket for fixing, for example by adhesive or rivets, over a spigot formed on the upper end of a wooden shaft, as in the hand grip 17' of FIG. 6.

An embodiment of a garden fork 20 is illustrated in FIGS. 3 and 4. The working head of the fork is assembled from rectangular section carbon steel or stainless steel strip, a first portion of the strip being bent to the shape of a U to form the footrest 21 and outer tines 22 of the fork, two equal-length strips being cut to form the inner two tines 23, and a rectangular metal plate 24 dimensioned to fit between the two inner tines and against the underside of the footrest of the U-shaped member. The free edge of the plate will be a chisel edge to facilitate movement of the fork into the ground. The U-shaped member 21, 22, the two tines 23 and the rectangular plate 24 are then held tightly together in a jig and the parts welded together to provide a flat surface on which the tang 13 of the fork is subsequently welded. This tang is made and shaped as described above in relation to the spade, is welded to the flat surface on the forward face of the fork and heat treated as described above in relation to the spade. The attachment of the shaft and hand grip is also as described in connection with the spade.

The tines of the fork are tapered, preferably at an early stage in manufacture, to a chisel-end shape which not only maintains the lifting area of the fork but also provides relatively sharp edges for easy penetration of the ground.

As an alternative fork construction, two strips of the rectangular section metal can be bent to identical U-shapes to form the two tines on each side of the working head of the fork, the rectangular plate being fitted and welded between the two U-shaped members to form a working head having the same appearance as in the fork of FIG. 6.

It will be seen that the constructions described above provide garden tools which can be made of relatively light-weight construction by providing a tubular tang which is strengthened by a liner over the curved portion at which a high bending stress must be resisted and, by welding on to a flat surface on the front of the blade or fork, a footrest remains which extends across the full width of the blade or fork head without interruption as in the case of a tang welded to the upper edge of the blade or fork head.

I claim:
1. A hand tool comprising
a working head,
a handle secured to a substantially flat surface of said working head,
a tang-forming portion of the handle adjacent the head being tubular and of oval cross-section and having a flat oblique oval end surface of which the major axis has a substantially greater length than that of the oval cross-section,
said end surface being welded to the flat surface of the head, and wherein
the said tang-forming portion of the handle is curved in a plane containing the major axis of the oval end surface and adjoining a main portion of the handle which thus extends at an angle to the head less than that between the head and the tang-forming portion of the handle immediately adjacent thereto.

2. A hand tool according to claim 3 wherein the tang-forming portion of the handle comprises two tubular members fitting closely one within the other, and both welded to the head.

3. A hand tool according to claim 2 wherein one of said tubular members extends beyond the other in a direction away from the head, a main portion of the handle being joined to said one of the tubular members.

4. A hand tool according to claim 1 wherein the head is a spade blade of sheet steel.

5. A hand tool according to claim 1 wherein the head is a fork.

6. A hand tool according to claim 5 wherein the fork comprises
a U shaped member defining two tines and a footrest,
two further tines disposed between the first mentioned tines, and
a plate flanked by said further tines and lying substantially in the plane of the four tines,
said U shaped member, said further tines and said plate being welded to one another,
said plate providing the flat surface to which the handle is secured.

7. A method of manufacturing a hand tool which comprises fitting together two tubes telescopically,
bending the two telescoped tubes to form a curved tang-portion of the handle of the tool,
flattening the bent tubes to give them an oval cross-section, the major axis of the oval lying in the plane of symmetry of the telescoped bent tubes,
cutting one end of the telescoped tubes in a plane perpendicular to the said plane of symmetry and obliquely to the axis of the tubes at the cut end thereof,
welding the cut ends of the telescoped tubes to a flat surface of a working head of the tool, and
fixing a hand grip to a shaft forming an extension of one of said tubes.

8. A method according to claim 7 which comprises the initial step of forming the working head as a fork by bending a bar into a U shape to form the footrest and two tines of a fork, welding said footrest and two further tines along three sides respectively of a flat plate, said plate itself, or together with the footrest and further tines, forming said flat surface of the working head.

* * * * *